July 3, 1951 R. M. M. OBERMAN 2,559,562

TERMINATION FOR TELEGRAPH LINES

Filed July 30, 1947

INVENTOR.

Roelof Martin Marie Oberman

BY

Patented July 3, 1951

2,559,562

UNITED STATES PATENT OFFICE 2,559,562

TERMINATION FOR TELEGRAPH LINES

Roelof M. M. Oberman, The Hague, Netherlands

Application July 30, 1947, Serial No. 767,533
In the Netherlands August 3, 1946

6 Claims. (Cl. 178—66)

The invention relates to a termination for telegraph line to be inserted between two-wire local lines and four-wire trunk telegraph lines, in particular voice frequency lines, in which termination the use of a hybrid transformer and of polar relays is avoided by the application of vacuum tubes.

Existing terminations for this purpose have the disadvantage of requiring a so-called local compensating resistance having different value for different local lines, which are being compensated to a fixed resistance value, its purpose being to obtain the functioning of the local receiving relay with virtual double current by the use of a compensating winding and when the said relay receives single current signal from the local line. When transmitting from the trunk to the local single current line the difficulty is experienced that the said local relay is thereby brought into action so that a general disturbance is introduced into the transmission. The use of polar relays in itself causes difficulties in such circuits due to the maintenance they require.

The above difficulties are avoided in the circuit according to the invention by the introduction of a resistance in the local circuit and by connecting the controlling electrodes (control grid and cathode) of a tube with the ends of this resistance, while another controlling electrode of the tube, preferably an anode or a screen grid, is coupled to a voltage source supplying the last mentioned electrode with the appropriate voltage on reception from the trunk of criteria (spacing or marking) current so that the state of conductibility of the tube only varies when transmitting from the local line to the trunk.

In this circuit, which is susceptible to variations, the advantage is obtained that polar relays are no longer required whereas the circuit may operate without incidental adjustment with local lines of different resistance, the adjustment of a local compensating resistance being entirely avoided due to the absence of a hybrid transformer.

The invention will be explained in detail with reference to the annexed two figures of which:

Figures 1, 2:
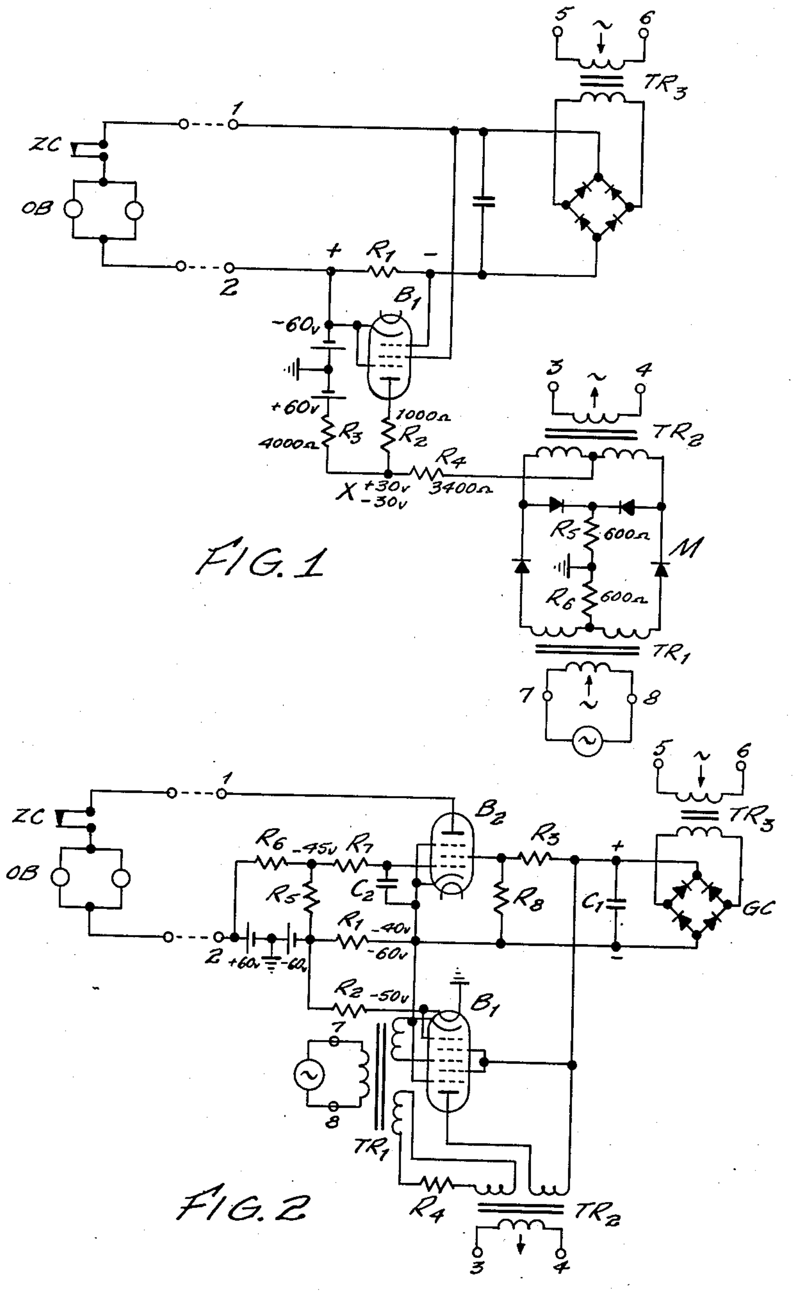
Fig. 1 shows the principle of the transformerless and relayless termination.
Fig. 2 shows an example of such a termination in conjunction with voice frequency telegraph systems.

In Fig. 1 the principle of the telegraph termination without hybrid coil or relays is shown in the coupling of a local single current two-wire line with a four-wire voice frequency trunk. The teleprinter is represented by transmitting contacts ZC and the receiving coils OB. It is coupled by the local line shown dotted to terminals 1 and 2 of the termination. The latter contains in series with the local line a resistance R1 and the rectifier cell GC with smoothing condenser C1. To terminals 5 and 6 of transformer TR3 the tone received from the other end of the connection in the spacing position is supplied after amplification to such an extent that after rectification by cells GC it causes a normal current of 40 ma. in the local line normalised to 3000 ohms. Transmission to the teleprinter shown may be effected by the interruption of this tone in a certain rhythm.

The normal current in the local line causes such a voltage drop in resistance R1 that tube B1 connected with a grid and cathode to the ends of this resistance is kept in non-conductive condition. The screen grid of tube B1 is connected to the positive output terminal of rectifier GC. The anode of tube B1 is connected via resistances R2 and R3 to the positive pole of a telegraph battery the centre of which may be grounded. The proportion of resistances R2 and R3 and R4 plus R5 or R6 is so chosen that the voltage of point X will alternate for conductive and non-conductive condition of tube B1 between minus 30 and plus 30 volts. Point X thus supplies double current to a modulator M which modulates in known manner a voice frequency alternating current supplied to terminals 7 and 8 of transformer TR1 in the rhythm of telegraph signals received.

When the drawn teleprinter transmits by the rhythmical interruption of transmitting contacts ZC the voltage drop at cross resistance R1 will decrease to 0 in the same rhythm. As the screen grid voltage is maintained tube B1 becomes conductive on the interruption of transmitting contacts ZC causing the voltage of point X to change from +30 v. to −30 v. The modulator M is brought to cut-off point whereby the normal current is interrupted till normal condition is reestablished by the closure of transmitting contacts ZC.

When transmitting from a distant point to the teleprinter reaction on the trunk transmitting line via tube B1 and modulator M will not occur as on the interruption of the local line current (marking current) due to the interruption of the frequency received in terminals 5 and 6 both the negative control grid voltage across resistance R1 and the screen grid voltage derived from the rectifier GC will become zero simultaneously. Tube B1 thus remains non-conductive. It is observed that the plate voltage of tube B1 may optionally also be derived from rectifier GC.

Practical application of the circuit of Fig. 1 is however attended with difficulties as when transmitting towards the teleprinter the screen grid voltage on tube B1 does not become zero momentarily due to local line capacity which has a retarding effect. Tube B1 is thereby momentarily, in dependence on the local line characteristics, brought into conductive condition, which is undesired. This objection might be removed by the introduction of a separate rectifier fed by the frequency received from the other end and which exclusively serves for providing the screen grid voltage of tube B1. The difficulty remains, however, that the alternating current power furnished to transformer TR3 must be rather high in order to provide the D. C. required by the local line (120 v., 40 ma.+10 ma. screen grid current of tube B1). Moreover the local line should be adjusted with the aid of series resistances to a fixed value. These series resistances influence the transmission in undesired manner. Figure 2 has been designed to remove these objections.

A tube B2 has been provided in this figure in series with the local line and the resistance R1. The plus and minus 60 v. telegraph battery is also connected in the line. Tube B2 is conductive in the condition when no signals pass towards the teleprinter. The normal current in the local line then amounts to 40 ma. Tube B2 is brought into non-conductive condition in a certain rhythm for the purpose of signalling towards the teleprinter, either by controlling the normal screen grid or by controlling the normal control grid. In the first case the screen grid is connected to a rectifier GC reeciving in spacing condition tone from the trunk line. In the second case the control grid is connected to such a rectifier. The necessary control energy is in both cases small. The first case has been shown in Figure 2. Tube B2 may be a pentode which leads to particular advantages in the termination without relays. As is well known, the anode current of a pentode does to a high degree not depend on the resistance in the anode lead. It is therefore possible to connect local lines which may greatly diverge in their properties to the termination without the interpretation of so-called complementary resistances, this fact leading to an improvement of transmission. From a transmission view point the constant line current is however a disadvantage when signalling towards the teleprinter shown as the ringing in phenomenon is too slow when tube B2 becomes conductive.

As in the region of low anode voltages for many types of pentodes a small deviation occurs from the said phenomenon of constant anode current resistances R5 and R6 are shown in Figure 2 across the telegraph battery. They furnish a certain negative control grid bias to tube B2 when in conductive condition. This bias is somewhat more negative than the cathode of tube B2 in conductive condition. Any possible remaining current variations in the local line are compensated. A current reduction in the local line causes the bias to become more positive so that the reduction is counteracted and conversely.

The potentiometer consisting of resistances R5 and R6 also provides the possibility to obtain a very considerable increase of the current whenever there is a transition in the condition of tube B2 from the non-conductive to the conductive state; this may be done by providing condenser C2. For if signals are sent towards the teleprinter shown by changing the conductivity of tube B2 the cathode of this tube will attain the voltage −60 v. whereas the control grid receives from the potentiometer a potential e. g. −45 v. Tube B2 will momentarily remain in the condition of high positive bias of the control grid due to the presence of condenser C2. The tube will thus yield a maximum current whereby the duration of the ringing-in phenomenon will be as small as possible.

It is observed that in this case also the ringing-off phenomenon occurring when the teleprinter transmits by means of contacts ZC will be as protracted as possible. When the transmitting contacts are open the local line will be charged with decreasing current. Tube B2 thereby attains increasing positive control grid bias, so that the resistance of this tube is reduced. This effect is also favourable on reclosure of send contacts ZC.

From a practical point of view the advantage is obtained that any individual regulation of the resistance of local lines is avoided so that any local line may operate with any termination according to Figure 2.

The circuit of tube B1 has also been modified in Figure 2. This tube is shown as a hexode. Tubes with still more electrodes designed for analogous functions may also be used. The voice frequency to be transmitted is applied to transformer TR1 in the circuit of Figure 2, the secondary winding of which is connected between the third grid and cathode of tube B1.

As tube B1 is in non-conductive condition for a spacing element of the teleprinter shown and in this condition voice frequency should be transmitted (according to convention) transformer TR1 has got a second secondary winding transmitting the space frequency to a third winding on transformer TR2. The other primary of transformer TR2 is inserted in the anode circuit of tube B1. The transmission of tone may be interrupted by the balancing action of the two primary windings of this transformer on tube B1 attaining conductive condition.

With a view to transmission the control grid circuit of tube B1 has also been modified with respect to that of Fig. 1. As the signals across the resistance R1 will have lost their rectangular character when the teleprinter shown is transmitting on a local line of some length the anode current of tube B1 of Fig. 1 will no longer show double current signals of rectangular shape. This means that on the keying of the voice frequency current by modulator M a serious distortion, which is not allowable is produced. This difficulty is avoided in the circuit of Figure 2. Tube B1 has a very slight grid swing e. g. 2 v. The filament current is about 100 ma. Across series resistance R2 the filament current is taken from the telegraph battery. The control grid is connected to the filament and thereby is given a fixed voltage of e. g. −50 v. Tube B1 has in spacing condition of the teleprinter a negative control grid voltage of e. g. −10 v. at the voltage drop across resistance R1 shown in the figure, whereas the control grid voltage increases to +10 v. on the opening of sending contacts ZC. The control grid of tube B1 should be protected by a resistance or a diode. It has not been shown in the figure. In this manner tube B1 is brought from the non-conductive to the conductive condition in a small portion of the line current change and conversely. The signals from tube B1 thereby obtain double current character and are rectangular in shape. They may be regulated to neutral by adjustment of resistance R1, this adjustment proving to be practically independent of the length of local lines occurring in practice. This remains to as long as the current attains its terminal value on the shortest signal elements.

The change of the condition of tube B1 from conductibility to non-conductibility has been directly combined according to Fig. 2 with the keying of voice frequency. The circuit described permits the termination of the invention to be used without adjustment of a transmission-technical nature in connection with local lines of divergent properties. This renders the circuit highly suitable for automatic telegraph systems, in which the through traffic between exchanges is worked on a voice frequency basis.

It is observed that when transmitting towards the teleprinter tube B1 is in non-conductive condition due to the disappearance of the screen grid and anode voltages. The anode voltage of tube B1 may be derived from the telegraph battery.

The circuits may be easily modified to operate with transit repeaters using polar relays without deviating from the principles. While I have illustrated and described what I regard to be the preferred embodiment of my invention, nevertheless it will be understood that such is merely exemplary and that numerous modifications and rearrangements may be made therein without departing from the essence of the invention, I claim:

1. In a telegraph termination a local line; a trunk circuit including an outgoing line and an incoming line; a vacuum tube having a cathode, a grid and a plate, said cathode and said grid being directly connected to said local line, said plate being connected to said outgoing line of said trunk circuit; means for rendering said tube conductive when signals are transmitted from said local line to said outgoing line of said trunk circuit; and means for rendering said tube non-conductive when signals are transmitted from said incoming line of said trunk circuit to said local line.

2. In a telegraph termination, a local line; a trunk circuit including an outgoing line and an incoming line; a resistance in said local line; a transformer having a primary winding connected to said incoming line of said trunk circuit; a secondary winding forming part of said transformer; a rectifier connecting said secondary winding to said local line; a vacuum tube having a cathode connected to one end of said resistance, a control grid connected to the other end of said resistance, and a plate connected to said outgoing line of said trunk circuit; a screen grid in said vacuum tube; and means for imparting to said screen grid a positive potential from said rectifier.

3. In a telegraph termination, a local line; a trunk circuit including an outgoing line and an incoming line; a resistance in said local line; a transformer having a primary winding connected to said incoming line of said trunk circuit; a secondary winding forming part of said transformer; a rectifier connecting said secondary winding to said local line; a vacuum tube having a cathode connected to one end of said resistance, a control grid connected to the other end of said resistance, and a plate connected to said outgoing line of said trunk circuit; a screen grid in said vacuum tube; means for imparting to said screen grid a positive potential from said rectifier; a battery and two resistances connected in series between said cathode and said plate; a modulator connected to said outgoing line of said trunk circuit; and a resistance connected in series between the first of said two resistances and said modulator, said resistances being so dimensioned that a predetermined potential is imparted to said modulator when signals are transmitted from said incoming line of said trunk circuit to said local line and a different pre-determined potention is imparted to said modulator when signals are transmitted from said local line to said outgoing line of said trunk circuit.

4. In a telegraph termination, a local line; a trunk circuit including an outgoing line and an incoming line; a resistance in said local line; a first transformer having a primary winding connected to said incoming line of said trunk circuit; a secondary winding forming part of said first transformer; a rectifier connecting said secondary winding of said first transformer to said local line; a vacuum tube having a cathode connected to one end of said resistance, a control grid connected to the other end of said resistance, and a plate connected to said outgoing line of said trunk circuit; a screen grid in said vacuum tube; means for imparting to said screen grid a positive potential from said rectifier; a battery and two resistances connected in series between said cathode and said plate; a modulator connected to said outgoing line of said trunk circuit; a generator; a second transformer having a primary winding energized by said generator and a secondary winding forming part of said modulator; a third transformer having a primary winding connected to said outgoing line of said trunk circuit; and a resistance connected in series between the first of said two resistances and the mid-point of said primary of said third transformer, said resistances being so dimensioned that a predetermined potential is imparted to said modulator when signals are transmitted from said incoming line of said trunk circuit to said local line and a different predetermined potential is imparted to said modulator when signals are transmitted from said local line to said outgoing line of said trunk circuit.

5. In a telegraph termination a local line; a trunk circuit including an outgoing line and an incoming line; a first vacuum tube operatively connected to said local line, said incoming line, and said outgoing line of said trunk circuit; a second vacuum tube connected in said local line; means for rendering said second tube conductive when no signals pass from said incoming line of said trunk circuit towards that local line; means for rendering said second vacuum tube non-conductive in a certain rhythm for signalling from said incoming line of said trunk circuit towards said local line; means for rendering said tube conductive when signals are transmitted from said local line to said outgoing line of said trunk circuit; and means for rendering said tube non-conductive when signals are transmitted from said incoming line of said trunk circuit to said local line.

6. In a telegraph termination a local line; a trunk circuit including an outgoing line and an incoming line; a pentode connected in said local line; a battery connected in series with said local line; a potentiometer connected across said battery; a control grid in said pentode; said control grid being kept at a constant potential by connecting said grid to an intermediate point of said potentiometer; a cathode forming part of that pentode; a resistance connected in series to said local line between said battery and said cathode; a condenser bridging said cathode and said control grid; a vacuum tube operatively connected to said local line, said incoming line, and said outgoing line of said trunk circuit; means for rendering said tube conductive when said signals are transmitted from said local line to said outgoing line of said trunk circuit; and means for rendering said tube non-conductive when signals are transmitted from said incoming line of said trunk circuit to said local line.

ROELOF M. M. OBERMAN.

REFERENCES CITED

The following references are of record in the file of this patent:

UNITED STATES PATENTS

| Number | Name | Date |
|---|---|---|
| 1,852,050 | Hamilton | Apr. 5, 1932 |
| 2,117,723 | Hysko | May 17, 1938 |
| 2,347,813 | Cummings | May 2, 1944 |